Figure 1:
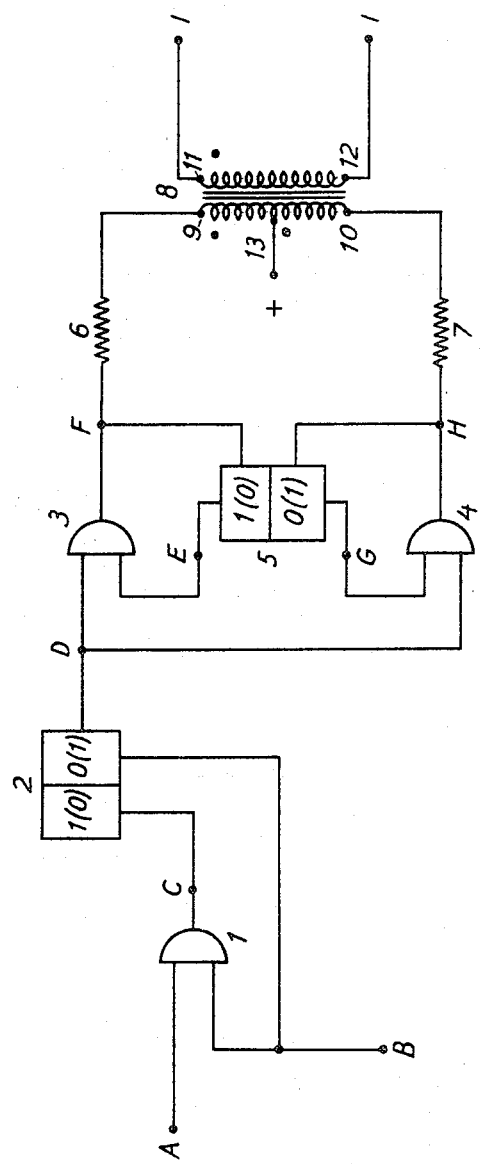

INVENTOR.
OSKAR EVERT LAMPA

United States Patent Office 3,370,238
Patented Feb. 20, 1968

3,370,238
ARRANGEMENT FOR CONVERSION OF UNIPOLAR PULSES INTO BIPOLAR ONES
Oskar Evert Lampa, Hagersten, Sweden, assignor to Telefonaktiebolaget L M Ericsson, Stockholm, Sweden, a corporation of Sweden
Filed Oct. 7, 1965, Ser. No. 493,840
Claims priority, application Sweden, Oct. 26, 1964, 12,864/64
1 Claim. (Cl. 328—57)

The present invention refers to an arrangement for stabilizing the time positions of unipolar pulses in a pulse train and for conversion of said unipolar pulses in the pulse train into bipolar pulses after the stabilizing.

In earlier used arrangements for conversion of unipolar pulses into bipolar pulses a derivation circuit has been used comprising amplification stages and a transformer, which has been connected between a source which gives clock pulses and one input of each of two AND-circuits. To a second input of each of said AND-circuit a pulse train has been fed which will be converted and to a third input of these AND-circuits, the outputs of a bistable switch circuit have been connected. The trigger inputs of the switch circuit have been connected to the outputs of each its blocking oscillator, the inputs of which are connected to the output of said respective AND-circuits. The outputs of the blocking oscillators have further been connected to a winding of the output transformer.

Owing to the use of blocking oscillators irregularities in the load arises which results in disturbances in the feeding from the mains. This means that a careful filtration of the voltage obtained from the mains supply unit must be carried out. Further the arrangement described above comprises a rather large number of components, and therefore it is wanted on one hand to diminish the number of included units, on the other hand to avoid the disadvantages mentioned. This is made possible by an arrangement in accordance with the present invention, in which the blocking oscillators mentioned above are not necessary and in which the number of included components has been diminished. By the arrangement according to the invention the load will be more constant and thereby the disturbance of the feeding from the mains smaller, the filtration of the voltage from the mains supply unit will thus be more simple. The arrangement according to the invention is furthermore provided with means for stabilizing the time positions of the pulses. The invetnion is characterized thereby that a first AND-circuit with the inputs connected on one hand to a source giving unipolar pulses, on the other hand to a source giving clock-pulses, and with the output connected to one trigger input of a first bistable switch circuit, the second trigger input of which is connected to said clock pulse source, and a second and a third AND-circuit, which have their one input connected to the output of said first switch circuit and their second input connected to each its output of a second bistable switch circuit, which has its respective trigger inputs connected to the respective output of said second and third AND-circuits, the outputs of which AND-circuits also being connected by a first winding of the transformer, which winding is provided with a centre tapping, the transformer also being provided with a second winding over which the bipolar pulses are obtained.

Figure 2:
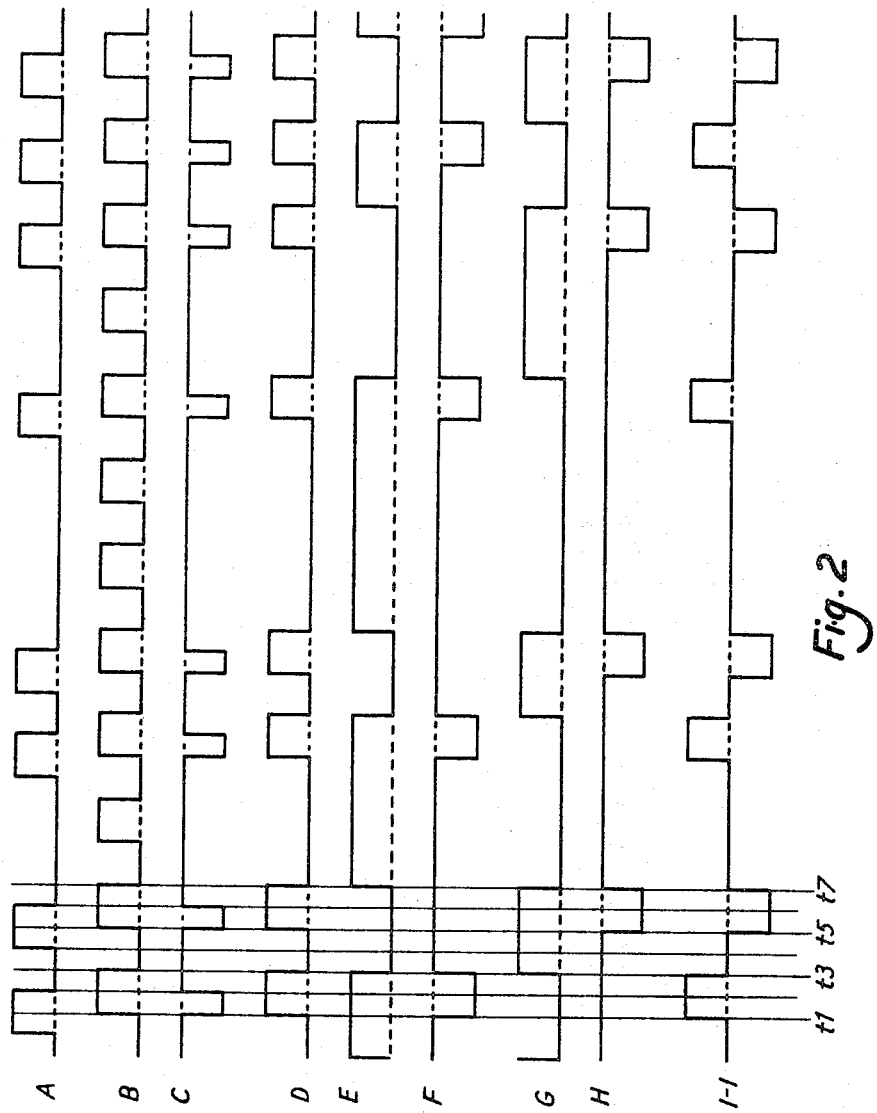

The invention will be further described in connection with the attached drawings, where FIG. 1 shows an arrangement in accordance with the invention and FIG. 2 shows the appearance of the pulses in different points in the arrangement. Thus the arrangement comprises a first part which gives a stability in the time positions of the fed pulses of the pulse train and a second part which transforms the unipolar pulses into bipolar. The first part comprises an AND-circuit 1, which has its first input connected to the input A for the unipolar pulses and its second input connected to the clock pulse source B. The output C of the AND-circuit 1 is connected to the first trigger input of a bistable switch circuit 2. The second input of this switch circuit is connected to said clock pulse source. To the input A unipolar pulses are fed for instance of the appearance shown in line A in FIG. 2. These pulses are fed to said first input of the AND-circuit 1. To the second input of this circuit clock pulses are fed, which are phase shifted 90° in relation to the pulses at the input A, that is phase shifted one bit corresponding to half the pulse width of the fed pulses. The clock pulses are shown on line B in FIG. 2. From the output C of the AND-circiut 1 a negative pulse is obtained in accordance with the line C in FIG. 2. The width of the pulse is thereby narrower than the originally fed and has a forward flank which is stable in its time position. This negative pulse is fed to the first trigger input of the bistable switch circuit 2. To the second trigger input of the circuit 2 pulses are fed from the clock pulse source. The forward flank of the negative pulse (at the time $t1$ in FIG. 2) actuates the switch circuit so that it is reversed from its one position to its other, and thereby a voltage is obtained at the output D of the switch circuit. The back flank of the clock pulse (at the time $t3$ in FIG. 2) actuates then the switch circuit, so that it again is reversed and takes its earlier position, the voltage at the output D ceases then. By this pulses are obtained at the output D of the switch circuit 2, which pulses have an appearance in accordance with the line D in FIG. 2. At the output D of the switch circuit pulses appear with the same shape as the pulses of the input signal. These new pulses show, however, a great carefulness as regards the timer stability.

The other part of the arrangement consists of the pulse inverter and comprises the AND-circuits 3 and 4, the bistable switch circuit 5 and the output transformer 8. The one input of each AND-circuit 3 and 4 is connected to the output D of the switch circuit 2. The other inputs of the AND-circuits 3 and 4 are connected to the outputs E and G respectively of the switch circuit 5. The outputs F and H respectively on the AND-circuits 3 and 4 are connected on one hand to the respective trigger input of the switch circuit 5, on the other hand over the series resistances 6 and 7 respectively to the winding 9–10 of the output transformer 8. The winding 9–10 is provided with a centre tapping 13, which is connected to the positive pole of a voltage source. The transformer 8 is further provided with an output winding 11–12, over which the shift directed pulses are obtained.

From the output of the switch circuit 2 pulses are fed in accordance with the line D in FIG. 2 to the inputs of the AND-circuits 3 and 4. The switch circuit 5 is thereby presumed to take such a position that from its output E a positive pulse is obtained and from its output G no pulse at all. This is clear from the lines E and G respectively in FIG. 2. As there is a pulse at both the inputs of the AND-circuit 3 during the time interval $t1$–$t3$, then at the output F of this circiut a negative pulse is obtained during this interval in accordance with the line F in FIG. 2. The obtained pulse is fed on one hand to the one trigger input of the switch circuit 5, on the other hand through the resistance 6 to the winding 9–13 of the output transformer 8. The back flank of this negative pulse causes the reversed position of the switch circuit 5, so that from the output G is now obtained a pulse and from the output E no pulse is obtained, which is clear from the lines G and E in FIG. 2. This means that when the next pulse from the output D of the switch circuit 2 comes to the AND-circuit 4 there will be a pulse at both the inputs to this AND-circuit. At the output H of the AND-circuit 4 a negative pulse arises hereby, which is shown on the line H in FIG. 2 and which is on one hand fed to the second trigger input of the switch circuit 5, and on the other hand to the winding 10–13 of the output transformer. The switch circuit 5 will hereby be actuated so that its position is reversed resulting therein that a positive pulse will again be obtained at the output E and no pulse will arise at the output G. The process described above will hereby be repeated. The switch circuit 5 has the task to alternately block the AND-circuits 3 and 4. The windings 9–13, 10–13 and 11–12 of the output transformer 8 are carried out so that in the output winding 11–12 the obtained pulses arise as bipolar pulses. The pulses appearing at the output I—I of the arrangement will hereby have the appearance shown on the line I—I in FIG. 2.

I claim:

1. An arrangement for stabilizing the time positions of unipolar pulses in a pulse train and for conversion of said unipolar pulses into bipolar pulses after the stabilizing, said arrangement comprising a first AND-circuit, a source giving unipolar pulses and a source giving clock pulses, one input of said AND-circuit being connected to said unipolar pulse source, a second input of said AND-circuit being connected to said clock pulse source, and the output of said AND-circuit being connected to one trigger input of a first bistable switch circuit, a second trigger input of said first bistable switch circuit connected to said clock pulse source, a second and a third AND-circuit, each of said second and third AND-circuits having a first input connected to the output of said first bistable switch circuit and a second input connected to respective outputs of a second bistable switch circuit, respective trigger inputs of said second bistable switch circuit being connected to respective outputs of said second and third AND-circuits, each output of said second and third AND-circuits also being respectively connected to a different end of a first winding of a transformer, said winding being provided with a centre tapping and said transformer being provided with a second winding, said second winding being an output winding for the bipolar pulses.

No references cited.

ARTHUR GAUSS, *Primary Examiner.*

J. ZAZWORSKY, *Assistant Examiner.*